US008546987B2

(12) United States Patent
Chai et al.

(10) Patent No.: US 8,546,987 B2
(45) Date of Patent: Oct. 1, 2013

(54) BRUSHLESS DC MOTOR

(75) Inventors: Jie Chai, Hong Kong (CN); Wan Mei He, Shenzhen (CN); Hong Jian Shi, Shenzhen (CN)

(73) Assignee: Johnson Electric S.A., Murten (CH)

( * ) Notice: Subject to any disclaimer, the term of this patent is extended or adjusted under 35 U.S.C. 154(b) by 463 days.

(21) Appl. No.: 12/886,026

(22) Filed: Sep. 20, 2010

(65) Prior Publication Data

US 2011/0068649 A1   Mar. 24, 2011

(30) Foreign Application Priority Data

Sep. 18, 2009   (CN) .......................... 2009 1 0190477

(51) Int. Cl.
H02K 7/08 (2006.01)
F16C 33/04 (2006.01)

(52) U.S. Cl.
USPC .................................. 310/88; 310/90; 29/598

(58) Field of Classification Search
USPC .................. 310/83, 90, 88; 29/596, 597, 598
See application file for complete search history.

(56) References Cited

U.S. PATENT DOCUMENTS

| | | | |
|---|---|---|---|
| 5,145,266 A | 9/1992 | Saneshige et al. | |
| 6,247,223 B1 * | 6/2001 | Keck | 29/596 |
| 6,247,702 B1 | 6/2001 | Long et al. | |
| 6,832,853 B2 | 12/2004 | Fujinaka | |
| 6,914,358 B2 | 7/2005 | Tokunnaga et al. | |
| 2004/0212336 A1 * | 10/2004 | McMillan et al. | 318/439 |
| 2007/0075601 A1 | 4/2007 | Shiraki | |

FOREIGN PATENT DOCUMENTS

| | | |
|---|---|---|
| GB | 2354291 | 3/2001 |
| JP | 56039321 | 4/1981 |
| JP | 62-104548 | 7/1987 |
| JP | 62104548 | 7/1987 |
| JP | 63087154 | 4/1988 |
| JP | 2254953 | 10/1990 |
| JP | 3050955 | 5/1991 |
| JP | 6197487 | 7/1994 |
| JP | 6351190 | 12/1994 |
| JP | 7071554 | 3/1995 |
| JP | 7298539 | 11/1995 |
| JP | 8021444 | 1/1996 |
| JP | 9317771 | 12/1997 |
| JP | 10164795 | 6/1998 |
| JP | 10201167 | 7/1998 |
| JP | 11008958 | 1/1999 |
| JP | 2002034205 | 1/2002 |
| JP | 2002101599 | 4/2002 |

(Continued)

*Primary Examiner* — Tran Nguyen
*Assistant Examiner* — David Scheuermann
(74) *Attorney, Agent, or Firm* — Muncy, Geissler, Olds & Lowe, PLLC

(57) ABSTRACT

A brushless direct current motor for use in a HVAC system, has a stator and a rotor rotatably mounted to the stator. The stator has a stator core, field windings wound on the stator core and a bushing. The rotor has a shaft rotatably supported by the bushing and adapted to connect with a valve adjuster of the HVAC system. The rotor also has at least one permanent magnet fixed with respect to the shaft. The bushing is a monolithic construction with two journal portions and one middle portion. The two journal portions support the shaft and are formed at respective axial ends of the middle portion. The middle portion has an inner diameter larger than an outer diameter of the shaft at portions corresponding to the middle portion, so as to form a gap between the middle portion and the shaft.

9 Claims, 3 Drawing Sheets

(56) References Cited

FOREIGN PATENT DOCUMENTS

| JP | 2002122141 | 4/2002 |
| JP | 2002295461 | 10/2002 |
| JP | 2006197664 | 7/2006 |
| JP | 2006342926 | 12/2006 |
| JP | 2008215391 | 9/2008 |
| WO | WO2004/072498 | 8/2004 |

* cited by examiner

BRUSHLESS DC MOTOR

CROSS REFERENCE TO RELATED APPLICATIONS

This non-provisional patent application claims priority under 35 U.S.C. §119(a) from Patent Application No. 200910190477.X filed in The People's Republic of China on Sep. 18, 2009.

FIELD OF THE INVENTION

This invention relates to a brushless direct current motor and in particular, to a brushless direct current motor for use in heating, ventilating and air-conditioning systems.

BACKGROUND OF THE INVENTION

Brushless direct current motors, also known as BLDC motors, are widely used in heating, ventilating and air-conditioning systems, also known as HVAC systems. For example, a BLDC motor is used to control a valve to regulate the amount of air flow. A traditional BLDC motor comprises a rotatable shaft which is supported by two separate bushings. The term "bushing", as used in this specification, including the appended clams, refers to a self-lubricating sleeve bearing, especially an oil-impregnated sintered bronze sleeve bearing. However, the lubrication contained in the bushing is limited and is used up over time. In addition, moisture or dust in the air may permeate inside the bushing through the gap between the shaft and the bushing so that the bushing and shaft are easily damaged. Therefore, the life span of the BLDC motor and HVAC system are decreased.

Therefore, there is a desire for an improved BLDC motor for a HVAC system.

SUMMARY OF THE INVENTION

Accordingly, in one aspect thereof, the present invention provides a brushless direct current motor for use in a HVAC system, comprising: a stator comprising a stator core, field windings wound on the stator core and a bushing; and a rotor rotatably mounted to the stator, comprising a shaft rotatably supported by the bushing and adapted to connect with a valve adjuster of the HVAC system, and at least one permanent magnet fixed with respect to the shaft; wherein the bushing is a monolithic construction having two journal portions and one middle portion, the two journal portions being integrally formed at respective axial ends of the middle portion and supporting the shaft; the middle portion having an inner diameter larger than an outer diameter of the shaft at portions corresponding to the middle portion, so as to form a gap between the middle portion and the shaft.

Preferably, lubricant is contained in the middle portion so that the middle portion functions as a lubricant reservoir for the two journal portions.

Preferably, the rotor comprises a housing, the at least one permanent magnet being fixed onto an inner surface of the housing, and the shaft comprises a mounting end fixed to the housing and an output end for connecting to the valve adjuster.

Preferably, the rotor comprises a baffle press-fitted on the output end of the shaft, the baffle rotating with the shaft and restricting moisture and dust entering the bushing through the gap between the shaft and one of the journal portions.

Preferably, the stator comprises a bushing holder for holding the bushing; the bushing holder comprising a recess in which the baffle is received.

Preferably, the outer diameter of the baffle is slightly less than the inner diameter of the recess.

Preferably, the rotor comprises a stopper fixedly mounted on the shaft and received in the opening, the baffle being located between the stopper and the bushing.

Preferably, the outer diameter of the journal portions is smaller than the outer diameter of the middle portion, and a gap is formed between the bushing holder and the journal portions.

According to a second aspect, the present invention also provides a method of producing a bushing for use in a BLDC motor as described above, the method comprising the steps of: 1) making a cylindrical semi-finished bushing body by compacting a metal powder; 2) sintering the semi-finished bushing body to form a sintered bushing body: 3) impregnating the sintered bushing body with oil using a vacuum oil filling machine; and 4) using a mold press to compress the end portions of the sintered bushing body radially inwardly against a sizing pin to reduce the inner and outer diameters of the end portions to form the finished bushing.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
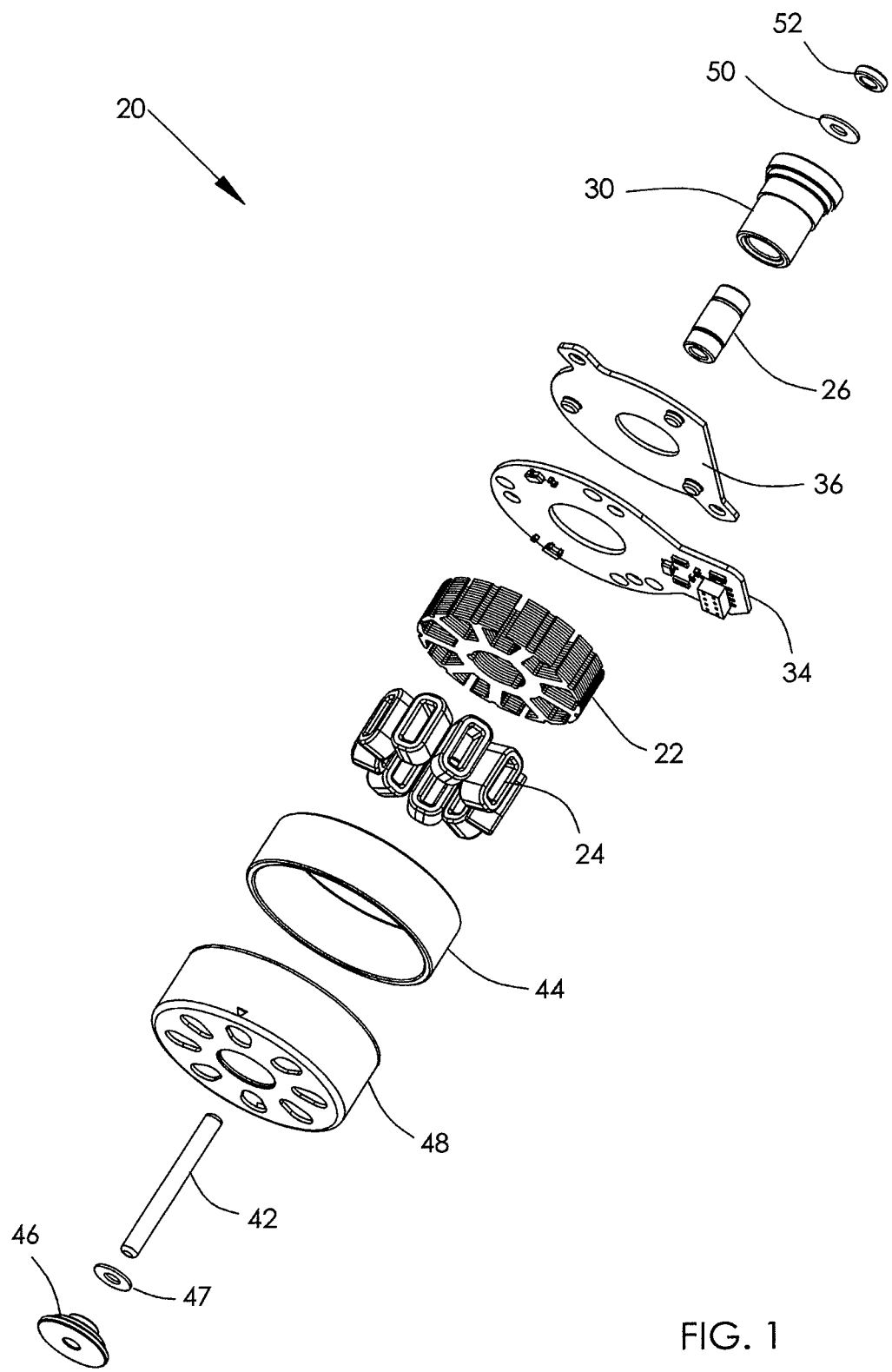
FIG. 1 is an exploded view of a BLDC motor for a HVAC system according to the preferred embodiment of the present invention.
Figure 2:
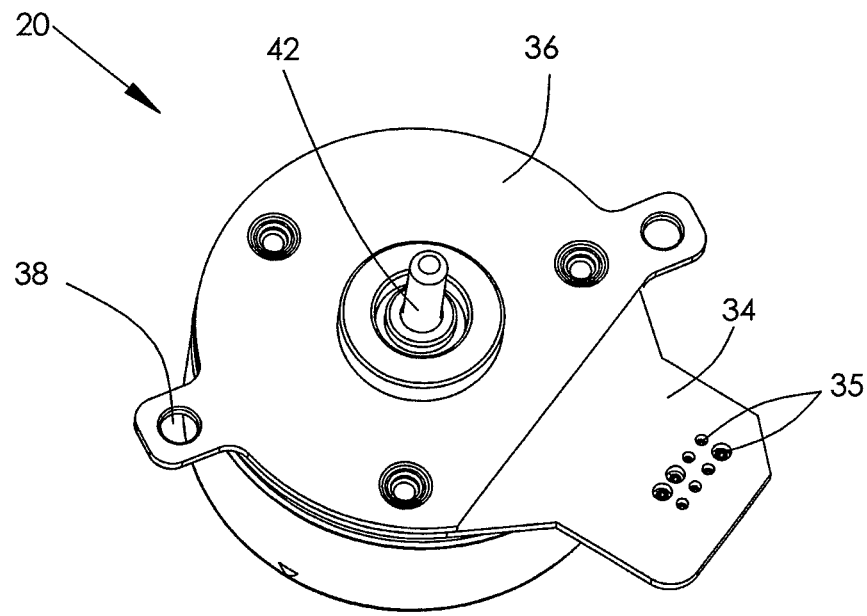
FIG. 2 is an assembled view of the BLDC motor.

A BLDC motor for HVAC systems according to the preferred embodiment of the present invention comprises an inner stator and an outer rotor. The stator comprises a stator core 22 and field windings 24 wound onto the stator core 22. The rotor comprises a shaft 42, a housing 48 fixed to the shaft and ring shaped permanent magnet 44 fixed to the housing 48 to rotate with the shaft 42. The rotor is rotatably mounted to the stator with the magnet 44 confronting the field windings 24. The stator includes a bushing 26 which supports the shaft 42 so as to permit the rotor to rotate with respect to the stator.

Figure 4:
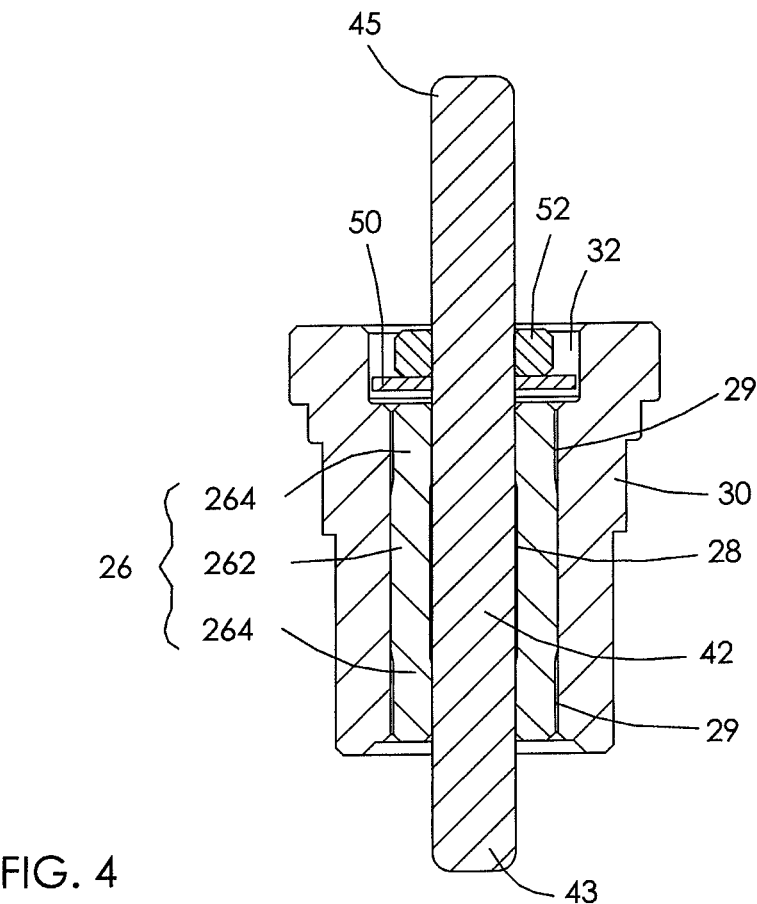
FIG. 4 is a sectional view of a bushing, bushing holder and shaft of the BLDC motor.

The bushing 26 as shown in detail in FIG. 4, comprises a middle portion 262 and two journal portions 264 that are integrally formed at respective ends of the middle portion 262. The two journal portions 264 make sliding contact with the shaft 42 to support the shaft 42, while the middle portion 262 has an inner diameter (ID) which is larger than the outer diameter (OD) of the shaft 42 at a portion corresponding to the middle portion 262. In other words, a gap is formed between the middle portion 262 and the shaft 42 so as to reduce the friction between the bushing 26 and the shaft 42. The shaft 42 passes through the bushing 26. One end of the shaft 42 is a mounting end 43 that is fixed to the rotor housing 48 by a shaft holder 46. The other end of the shaft 42 is to be connected to the valve adjuster of the HVAC system as an output end 45. As is known, opening of the valve is controlled by a valve adjuster to regulate the amount of flow such as air flow. In this embodiment, the permanent magnet 44 is mounted to an inner surface of the housing 48, around the stator core 22 and the field winding 24. While a ring magnet is preferred due to the ease of assembly, the rotor poles could be formed by a number of permanent magnets fixed to the housing.

Figure 5:
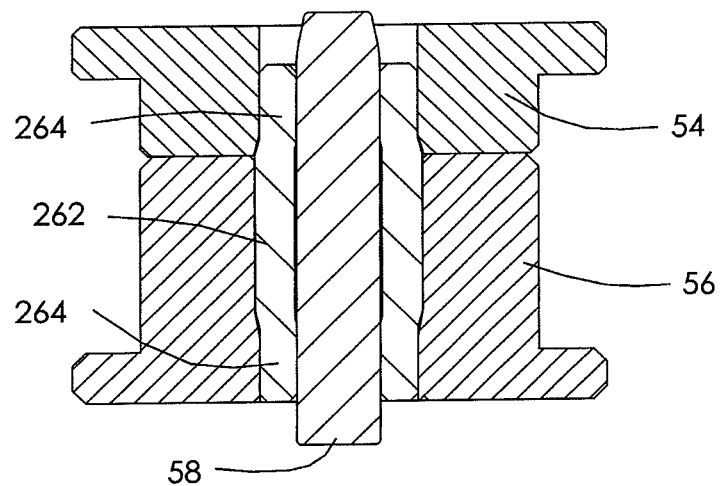
FIG. 5 illustrates a mold for making the bushing shown in FIG. 4.

The bushing 26 is a self-lubricating bushing and preferably a oil-impregnated sintered bronze bushing made according to the following steps: 1) making a semi finished (or green) bushing body by compacting bronze powder, the semi finished bushing body being a cylinder having a constant ID and constant OD; 2) sintering the semi finished bushing body to form a sintered bushing body; 3) impregnating the sintered bushing body with oil using a vacuum oil filling machine; and 4) using a mold press to compress the end portions of the sintered bushing body radially inwardly against a sizing pin to reduce the inner and outer diameters of the end portions to form the finished bushing, which will be described with reference to FIG. 5.

As shown in FIG. 5, the mold press comprises a lower half 56 having a circular hole for receiving a part of the sintered bushing body, a sizing pin 58 disposed at a center of hole of the lower half 56, and a upper half 54 that also has a circular hole for receiving the other part of the sintered bushing body. The diameter of the circular hole in the lower half 56 varies so as to define the OD of one journal portion 264 and the OD of the middle portion 262. More specifically, the hole in the lower half 56 has a lower part with a smaller diameter that defines the OD of the lower journal portion 264 and an upper part which has a larger diameter that is substantially equal to the OD of the middle portion 262. The hole in the upper half 54 has a diameter that defines the OD of the upper journal portion 264. When the lower half 56 and upper half 54 are closed, the two axial ends of the sintered bushing body are pressed inwardly to form the two journal portions 264. The ID of the two journal portions 264 are defined by the OD of the sizing pin 58 against which the two journal portions are squeezed, which is smaller than the ID of the middle portion.

As mentioned above, oil is contained in the bushing for lubrication. When the oil density in the two journal portions 264 decreases, the oil contained in the middle portion 262 will permeate to the two journal portions 264 so that the life span of the interface between the bushing 26 and shaft 42 is prolonged. That is, the middle portion 262 provides extra lubricant for the two journal portions 264 and acts as an oil reservoir.

The rotor further comprises a baffle 50, as shown in FIG. 4, fixed to the shaft 42 at the portion that extends out of the bushing 26. The baffle has a fitting hole and is press-fitted to the shaft 42 so as to rotate with the shaft 42. By using the press-fitted baffle 50, it is more difficult for moisture and dust to enter into the bushing through the gap between the shaft 42 and the bushing 26. Therefore, life span of the bushing/shaft is prolonged.

The stator further comprises a bushing holder 30 for holding the bushing 26. The OD of the bushing 26 at the journal portions 264 is smaller than the OD at the middle potion 262. A gap 29 is formed between the bushing holder 30 and the two journal portions 264. This allows the bushing 26 a small amount of moment so that it can accept a shaft 42 that is slightly bent or misaligned. The bushing holder 30 comprises a recess 32 facing output end of the shaft 26. The baffle 50 is received within the recess 32. Preferably, the baffle is disc-shaped and has an OD that is slightly smaller than the diameter of the recess 32. Thus for moisture and dust to enter the bushing, the moisture and dust has to pass through the gap between the outer edge of the baffle 50 and the recess 32, pass along the gap between the baffle and the axial end of the bushing, and then pass into the gap between the journal portion and the shaft. Thus, compared with a traditional BLDC motor, the BLDC motor according to the preferred embodiment has a much longer passage for the moisture and dust to enter the bushing, forming a simple labyrinth seal, to reduce the amount of moisture and dust which contaminates the bushing/shaft interface.

Furthermore, a stopper 52 is fixedly mounted to the shaft 26 adjacent to the baffle 50 and received in the recess 32 such that the baffle is between the stopper and the bushing. The baffle may act as a thrust bearing by forming a rubbing surface between the stopper and the bushing in the axial direction. The stopper 52 prevents the rotor separating from the stator.

Preferably, one or more washers 47 are disposed about the shaft 26 between the bushing 26 and the shaft holder 46. The number of washers are chosen to adjust the axial play of the rotor and the washers function as a thrust bearing providing a rubbing surface restricting axial movement of the rotor.

Figure 3:
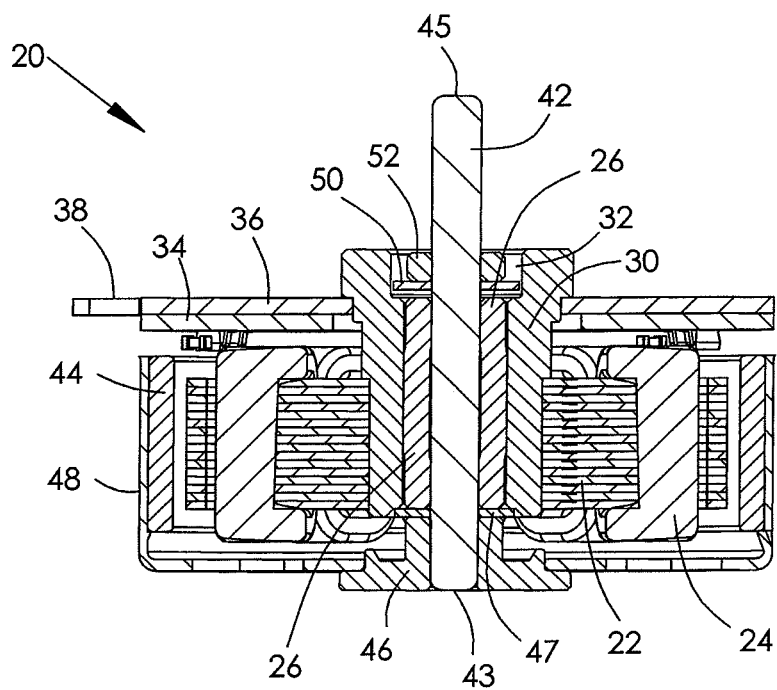
FIG. 3 is a cross sectional view of the BLDC motor.

As shown in FIG. 1 and FIG. 3, the rotor housing 48 is cup-shaped, having a circular bottom and a cylindrical side wall extending from the bottom. The stator comprises a printed circuit board (PCB) 34 and a mounting plate 36 that are fixed to the bushing holder 30. The PCB 34 and the mounting plate 36 are disposed at the opening of the cup-shaped housing 48. Electronic components are mounted on the PCB 34 to control the motor. Mounting holes 38 are formed in the mounting plate 36 for mounting the BLDC motor. Terminal holes 35 are provided in the PCB 34 for the connection of signal and power wires for operating the motor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow. The phrase that the two journal portions of the bushing are integrally formed with the middle portion means that the bushing as a whole, including the middle portion and the two journal portions, is constructed as a monolithic construction. Also, while the preferred bushing is of sintered bronze, other metal powders may be used such as iron powder to produce a sintered iron bushing.

The invention claimed is:

1. A brushless direct current motor for use in a HVAC system, comprising:
   a stator comprising a stator core, field windings wound on the stator core, a bushing, and a bushing holder for holding the bushing; and
   a rotor rotatably mounted to the stator, the rotor comprising a shaft rotatably supported by the bushing and adapted to connect with a valve adjuster of the HVAC system, and at least one permanent magnet fixed with respect to the shaft;
   wherein the bushing is a monolithic construction having two journal portions and one middle portion, the two journal portions being integrally formed at respective axial ends of the middle portion and supporting the shaft; the middle portion having an inner diameter larger than an outer diameter of the shaft at portions corresponding to the middle portion, so as to form a gap between the middle portion and the shaft; and wherein the journal portions are respectively located at two axial ends of the bushing, the outer diameter of each of the journal portions is smaller than the outer diameter of the middle portion, and a gap is formed between the bushing holder and each journal portion.

2. The motor of claim 1, wherein lubricant is contained in the middle portion so that the middle portion functions as a lubricant reservoir for the two journal portions.

3. The motor of claim 1, wherein the rotor comprises a housing, the at least one permanent magnet being fixed onto an inner surface of the housing, and the shaft comprises a mounting end fixed to the housing and an output end for connecting to the valve adjuster.

4. The motor of claim 3, wherein the rotor comprises a baffle press-fitted on the output end of the shaft, an outer diameter of the baffle is larger than the outer diameter of the bushing, the baffle rotating with the shaft and restricting moisture and dust entering the bushing through the gap between the shaft and one of the journal portions.

5. The motor of claim 4, wherein the bushing holder comprises a recess in which the baffle is received.

6. The motor of claim 5, wherein the outer diameter of the baffle is slightly less than the inner diameter of the recess.

7. The motor of claim 6, wherein the rotor comprises a stopper fixedly mounted on the shaft and received in the opening, the baffle being located between the stopper and the bushing.

8. A method of producing a bushing for use in a motor according to claim 1, the method comprising the steps of:

1) making a cylindrical semi-finished bushing body by compacting a metal powder;
2) sintering the semi-finished bushing body to form a sintered bushing body:
3) impregnating the sintered bushing body with oil using a vacuum oil filling machine; and
4) using a mold press to compress the end portions of the sintered bushing body radially inwardly against a sizing pin to reduce the inner and outer diameters of the end portions to form the finished bushing.

9. A brushless direct current motor for use in a HVAC system, comprising:
   a stator comprising:
   a stator core;
   a plurality of field windings wound on the stator core; and
   a bushing being a monolithic construction and having two journal portions and a middle portion integrally formed between the journal portions; and
   a rotor rotatably mounted to the stator, comprising:
   a shaft rotatably supported by the journal portions of the bushing and adapted to connect with a valve adjuster of the HVAC system, an outer diameter of the shaft at portions corresponding to the middle portion is smaller than the inner diameter of the middle portion of the bushing, so as to form a gap between the middle portion and the shaft;
   at least one permanent magnet fixed with respect to the shaft; and
   a baffle press-fitted on an output end of the shaft, an outer diameter of the baffle being larger than the outer diameter of the bushing, the baffle rotating with the shaft and restricting moisture and dust entering the bushing through the gap between the shaft and one of the journal portions.

* * * * *